3,424,027
REMOTE CONTROL ASSEMBLY
August E. Tschanz, Birmingham, and William L. Frank, Dearborn, Mich., assignors to Teleflex Incorporated, North Wales, Pa., a corporation of Delaware
Filed Apr. 24, 1967, Ser. No. 633,298
U.S. Cl. 74—502                                  14 Claims
Int. Cl. F16c 1/10, 11/04; B21d 39/02

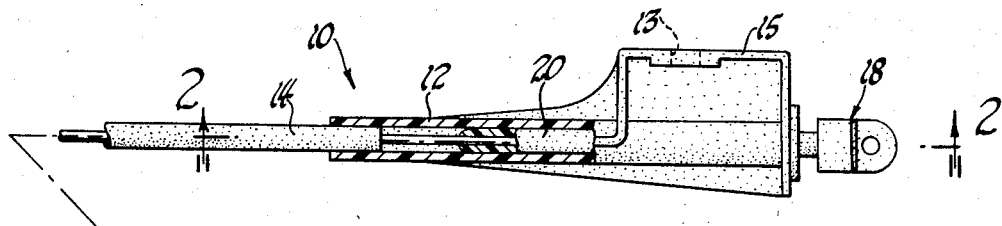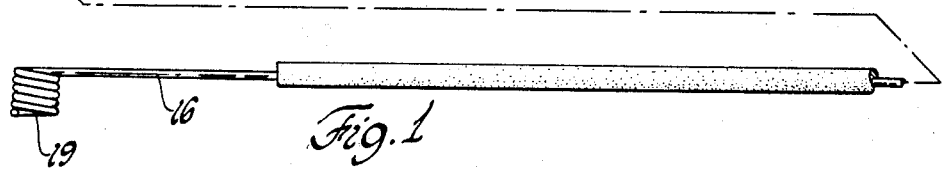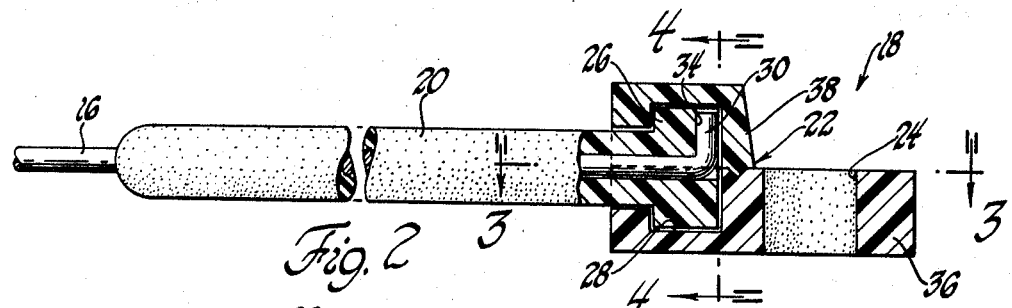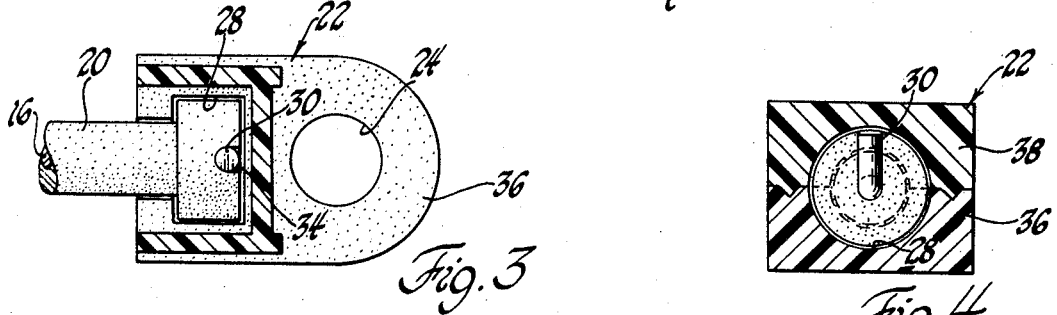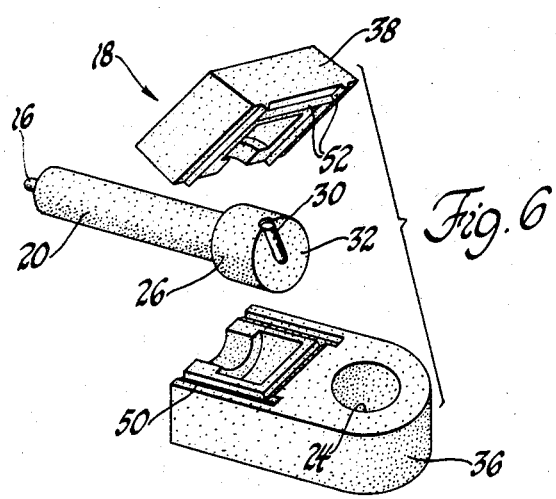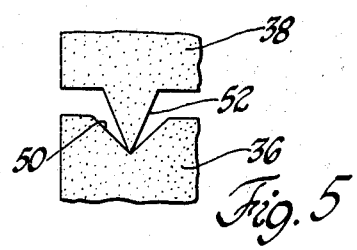
INVENTORS
August E. Tschanz, &
William L. Frank
ATTORNEYS United States Patent Office 3,424,027
Patented Jan. 28, 1969

ABSTRACT OF THE DISCLOSURE

A motion transmitting remote control assembly including a fitting adapted for attachment to a support structure and secured to a flexible conduit. A motion transmitting core element movably supported in the fitting and the conduit. At least one end of the core element being adapted for attachment to a control element and comprising an elongated first member of organic polymeric material disposed in mechanical interlocking engagement with the core element and a second member of organic polymeric material disposed about the first member so as to allow relative rotation therebetween so that the second member may rotate relative to the core element. The second member has a hole therethrough for attachment to a control element.

---

Remote control assemblies which have heretofore been utilized typically include a guide having a flexible conduit secured to an end fitting which is adapted to be attached to a support structure and a motion transmitting core element movably disposed within the conduit and the end fitting. Such remote control assemblies are variously utilized in marine, automotive and aircraft vehicles. For example, such remote control assemblies are typically utilized in automobiles to operate hood latches and air vent controls. A guide comprising a conduit and an end fitting may be secured to the support structure of the automobile such that one end of the core element is attached to a vent control element while the other end of the core element is attached to a controlling member or a knob adjacent the instrument panel.

The motion transmitting core element is normally a wire-like member and is adapted at the ends thereof for attachment to control elements by being formed into a series of coils, which are commonly collectively referred to as a "pigtail." When the end of such a core element is connected to a control element, at least a portion of the control element is disposed within the coils forming the pigtail. When pigtails are formed at both ends of such a core element, they have a certain angular relationship with one another depending upon the direction the coils at each end extend relative to the longitudinal axis of the core element. It frequently occurs that upon the installation of such remote control assemblies, the control elements to which the ends of the core element are to be attached are disposed at various angles relative to the longitudinal axis of the core element and therefore necessitates the twisting of the core element about its longitudinal axis by rotating the opposite ends of the core element relative to one another so that they may be properly aligned for attachment to the control elements. In other words, it is frequently necessary to rotate a pigtail at an end of the core element by twisting the core element in order to position the pigtail for attachment to a control element.

Accordingly, it is an object and feature of this invention to provide a motion transmitting remote control assembly including a guide with a motion transmitting core element movably supported in the guide and including terminal means of organic polymeric material rotatably attached to the core element so that the core element may be installed without twisting about the longitudinal axis thereof.

Another object and feature of this invention is to provide a motion transmitting remote control assembly including a conduit attached to a fitting with a motion transmitting core element movably supported in the conduit and the fitting and a first member molded about the end of the core element and having an enlarged portion at the end thereof and a second member disposed about the enlarged portion to allow relative rotation between the mechanically interconnected members, the second member being adapted for securement to a control element.

In general, these and other objects and features of this invention may be attained in a preferred embodiment wherein a motion transmitting wire-like core element is movably supported in a guide. A first member is molded about one end of the core element and includes an enlarged end portion. The core element extends through the member to an end portion which extends transversely to the longitudinal axis for mechanically interlocking the core element and the first member. The first member is made of an organic polymeric material. A first element having a pocket therein is disposed partly about the enlarged end portion of the first member and a second element having a pocket therein is disposed about the remainder of the enlarged portion and is in engagement with the first element. The two elements are made of an organic polymeric material which is incompatible for bonding to the organic polymeric material of the first member. The two elements are fused together, such as by sonic welding, without bonding to the first member so that the elements form a second member which is rotatably disposed on the first member and therefore rotatable relative to the motion transmitting core element.

Other objects and attendant advantages of the present invention will be readily appreciated as the same becomes better understood by reference to the following detailed description when considered in connection with the accompanying drawings wherein:

FIGURE 1 is a side elevational view partially in cross section of a preferred embodiment of the remote control assembly of the instant invention;

FIGURE 2 is an enlarged fragmentary cross-sectional view taken substantially along line 2—2 of FIGURE 1;

FIGURE 3 is a fragmentary cross-sectional view taken substantially along line 3—3 of FIGURE 2;

FIGURE 4 is a cross-sectional view taken substantially along line 4—4 of FIGURE 2;

FIGURE 5 is an enlarged fragmentary view showing the engagement of two elements forming the rotating member of the combination before the elements are to be fused together; and FIGURE 6 is an exploded view showing the two elements comprising the rotatable member before the elements are fused together.

Referring now to the drawings, wherein like numerals indicate like or corresponding parts throughout the several views, a motion transmitting remote control assembly constructed in accordance with the instant invention is generally shown at 10. The motion transmitting remote control assembly 10 includes a guide comprising the fitting 12 and a conduit 14. The conduit 14 is flexible and is of the type having an outer casing of organic polymeric material and the fitting 12 is molded of an organic polymeric material about the conduit 14. A wire-like motion transmitting core element 16 is movably supported in the fittting 12 and the conduit 14. The fitting 12 is adapted to be attached to a support structure by the holes 13 in the flange 15.

The remote control assembly also includes a terminal means, generally indicated at 18. The terminal means 18 is made of an organic polymeric material and has at least a portion rotatable relative to the core element 16. The opposite end of the core element 16 includes a plurality of coils forming the pigtail 19 which may be attached to a control element.

The terminal means 18 includes a first member 20 disposed about the core element 16 and a second member 22 disposed in mechanical interlocking engagement with the first member 20 and adapted by the hole 24 for attachment to a control element. The first member 20 includes an elongated portion which is slidably disposed in a bore of the fitting 12 and an enlarged flanged portion 26. The second member 22 has a pocket 28 therein and the enlarged portion 26 is disposed in the pocket 28.

The wire-like core element 16 extends through the first member 20 to an end portion 30 which extends transversely to the longitudinal axis of the core element for preventing the core element 16 from being removed from the first member 20. The enlarged portion 26 of the first member 20 has a circular surface which extends circumferentially about the longitudinal axis of the core element 16 so that the first member 20 may rotate in the pocket 28. The end face 32 of the enlarged portion 26 has a recess 34 therein and the transversely extending end portion 30 of the core element 16 is disposed in the recess 34. The recess 34, therefore, limits relative rotation between the core element 16 and the first member 20 about the longitudinal axis of the core element 16.

The second member 22 comprises two elements 36 and 38 which are fused together and define the pocket 28. The element 36 has the hole 24 therethrough for attachment to a control element.

It is important to note that in the preferred embodiment the first member 20 is made of an organic polymeric material and the elements 36 and 38 are made of an organic polymeric material which is incompatable for diffusing with or bonding to the organic polymeric material of the member 20 so that when the elements 36 and 38 are fused together, they are not fused to the member 20. Thus, after the elements 36 and 38 have been fused together, the resulting member 22 is rotatable relative to the member 20.

In manufacturing the instant invention, the end of the motion transmitting core element 16 is deformed to form the portion 30. Thereafter, the first member 20 is disposed about the core element 16 and is made of an organic polymeric material. Preferably, the first member 20 is made of nylon. The elements 36 and 38 are preformed by molding and one of the members includes grooves, as indicated at 50 in FIGURE 5, while the other member includes sharp projections, as indicated at 52 in FIGURE 5. The grooves 50 are wider than the projections 52 so that when the projections 52 are disposed in the grooves 50, there is sharp contact therebetween. The elements 36 and 38 are then disposed about the enlarged portion 26 of the first member 20 so that they are in contact with one another as illustrated in FIGURE 5. The assembly is then disposed in a sonic welder which fuses the elements 36 and 38 together by breaking down the projections 52. The sharp contact between the projections 52 and the grooves 50 facilitates the sonic welding to fuse the elements 36 and 38 together. Once the elements 36 and 38 are fused together, they form the second member 22 which is rotatably disposed on the first member 20. Since the elements 36 and 38 are made of an organic polymeric material incompatible for bonding to the organic polymeric material of the member 20, no diffusion or bonding occurs between the first member 20 and the elements 36 and 38 during the welding step. In the preferred embodiment, the elements 36 and 38 are made of an acetal resin.

The invention, therefore, provides a terminal means on the end of the core element which includes a first member 20 disposed in mechanical interlocking engagement with the core element 16 and a second member 22 rotatably disposed on the member 20 and in mechanical interlocking engagement therewith to prevent relative longitudinal movement therebetween. Thus, during the installation of the assembly, the member 22 may be rotated to any particular disposition to accommodate the insertion of a control element into the hole 24 thereof without the necessity of twisting the core element.

The embodiments of the invention in which an exclusive property or privilege is claimed are defined as follows:

1. A motion transmitting remote control assembly comprising; a guide, a wire-like motion transmitting core element movably supported by said guide, said core element having a bent end portion extending transversely to the longitudinal axis thereof, and terminal means of organic polymeric material disposed about and retained on said core element by said bent end portion of said core element and with at least a part thereof freely rotatable relative to said core element and including hole means for attachment to a control element.

2. A motion transmitting remote control assembly as set forth in claim 1 wherein said terminal means includes a first member disposed about said core element and said part thereof is a second member rotatably disposed in mechanical interlocking engagement with said first member and adapted for attachment to a control element.

3. A motion transmitting remote control assembly as set forth in claim 2 wherein said first member is made of an organic polymeric material and said second member is made of an organic polymeric material which is incompatible for bonding to the organic polymeric material of said first member.

4. A motion transmitting remote control assembly as set forth in claim 2 wherein said first member extends longitudinally along a portion of the length of said core element and terminates in an enlarged portion, said second member having a pocket therein and said enlarged portion being disposed in said pocket.

5. A motion transmitting remote control assembly as set forth in claim 4 wherein said core element extends through said first member to said bent end portion extending transversely to the longitudinal axis thereof for preventing said core element from being removed from said first member.

6. A motion transmitting remote control assembly as set forth in claim 5 wherein said guide includes a fitting adapted for attachment to a support structure and having a bore extending therethrough, said first member being slidably disposed in said bore of said fitting.

7. A motion transmitting remote control assembly as set forth in claim 6 wherein said guide includes a conduit secured to said fitting and movably supporting said core element.

8. A motion transmitting remote control assembly as set forth in claim 6 wherein said enlarged portion of said first member includes a circular surface which extends circumferentially about the longitudinal axis of said core element so that said first member may rotate relative to said second member about the longitudinal axis of said core element.

9. A motion transmitting remote control assembly as set forth in claim 8 wherein said enlarged portion includes an end face having a recess therein and the transversely extending bent end portion of said core element is disposed in said recess.

10. A motion transmitting remote control assembly as set forth in claim 9 wherein said recess includes radially extending walls to limit relative rotation between said core element and said first member about the longitudinal axis of said core element.

11. A motion transmitting remote control assembly as set forth in claim 9 wherein said second member comprises two elements fused together and defining said pocket.

12. A motion transmitting remote control assembly as set forth in claim 11 wherein one of said two elements has said hole therethrough for attachment to a control element.

13. A motion transmitting remote control assembly as set forth in claim 11 wherein said first member is made of an organic polymeric material and said two elements are made of a different organic polymeric material which is incompatible for bonding to the organic polymeric material of said first member.

14. A motion transmitting remote control assembly as set forth in claim 13 wherein said first member is made of nylon and said two elements are made of an acetal resin.

References Cited

UNITED STATES PATENTS

| | | | |
|---|---|---|---|
| 1,710,488 | 4/1929 | Oliphant | 74—502 |
| 2,132,919 | 10/1938 | Arens | 74—502 |
| 2,502,780 | 4/1950 | Dreffein | 74—502 |
| 2,869,391 | 1/1959 | Brock | 74—503 |
| 3,256,051 | 6/1966 | Howe | 156—73 X |
| 3,298,243 | 1/1967 | Geissler et al. | 74—501 |
| 3,320,807 | 5/1967 | Taylor et al. | 156—73 X |
| 3,373,632 | 3/1968 | Jeromson et al. | 74—501 |

MILTON KAUFMAN, *Primary Examiner.*

U.S. Cl. X.R.

29—463; 264—242; 287—91